United States Patent [19]

Henline

[11] Patent Number: 4,930,589

[45] Date of Patent: Jun. 5, 1990

[54] OPERATOR GUIDEBAR FOR A WALK-BESIDE ARTICULATED MACHINE

[75] Inventor: John W. Henline, Lisbon, N. Dak.

[73] Assignee: Clark Equipment Company, South Bend, Ind.

[21] Appl. No.: 362,878

[22] Filed: Jun. 7, 1989

[51] Int. Cl.⁵ .............................................. B62D 51/04
[52] U.S. Cl. ................................... 180/19.1; 172/508; 280/87.2; 293/128
[58] Field of Search ............... 293/128; 180/19.1, 19.2, 180/19.3, 320, 134, 135, 136, 137, 138, 139, 271, 272, 274, 286, 287, 289; 172/508; 280/87.2

[56] References Cited

U.S. PATENT DOCUMENTS

| | | | |
|---|---|---|---|
| 1,632,858 | 6/1927 | Smid | 280/87.2 |
| 2,441,132 | 5/1948 | Blakey | 172/508 |
| 3,596,962 | 8/1971 | Hertzell | 293/128 |
| 3,610,669 | 10/1971 | Morrissey, Sr. | 293/128 |
| 4,060,268 | 11/1977 | Page, Jr. | 293/128 |
| 4,437,697 | 3/1984 | Hinojos | 293/128 |

Primary Examiner—Mitchell J. Hill
Attorney, Agent, or Firm—Kinney & Lange

[57] ABSTRACT

A guidebar used on a walk-beside articulated machine having a first machine portion and a second machine portion which swivel about a pivot point. A first bar portion has a first end and a swivel end. The first end is fixably attached to the first machine portion. A swing arm has a first swing arm end and a second swing arm end. The first swing arm end is pivotally attached to the second machine portion. A second bar portion has a first end and a second end. The first end is pivotally attached to the second swing arm end and the second end is pivotally attached to the swivel end of the first bar portion.

16 Claims, 3 Drawing Sheets

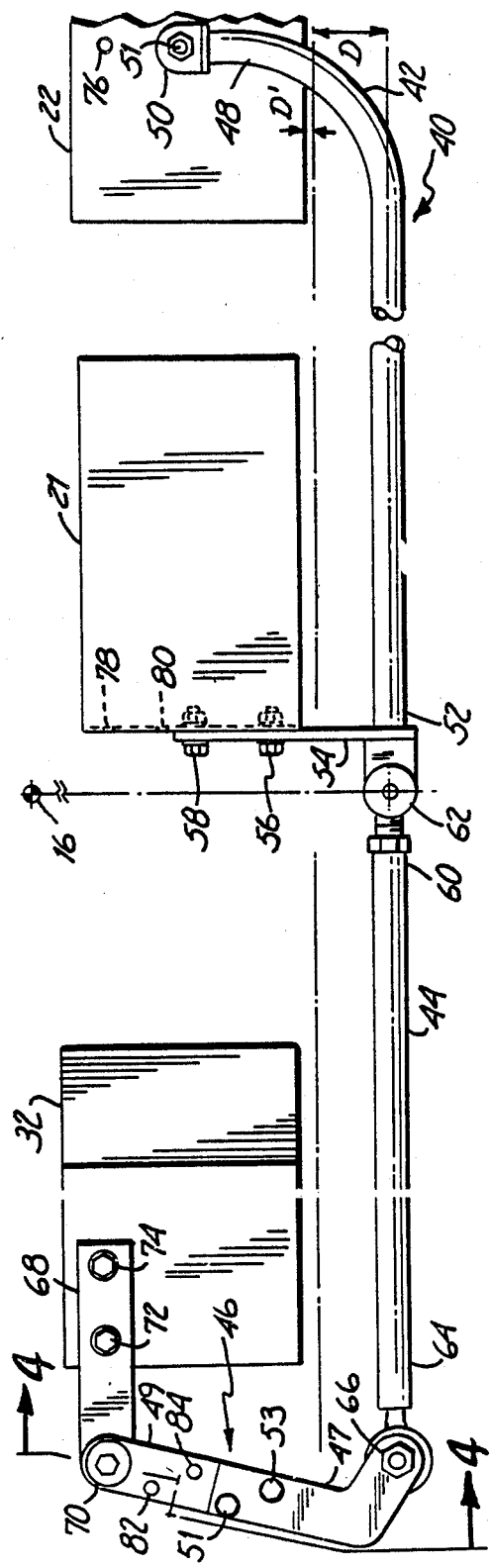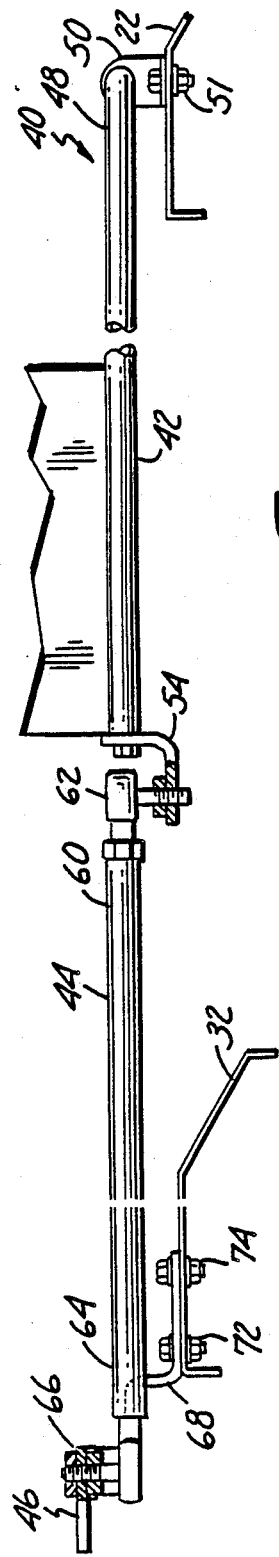

OPERATOR GUIDEBAR FOR A WALK-BESIDE ARTICULATED MACHINE

BACKGROUND OF THE INVENTION

1. Field of the Invention

The present invention relates to a guidebar for use with a walk-beside articulated trencher.

2. Description of the Prior Art

There are many uses for walk-beside, articulated machines. For example, trenching and vibratory plow attachments are often mounted on such machines. During operation, an operator typically stands beside a control panel which is mounted on the articulated machine. The operator walks beside the articulated machine controlling operation of the trenching and plow attachments by using controls on the control panel. This operating position provides the operator with good visibility to all working parts of the machine.

SUMMARY OF THE INVENTION

The present invention is a guidebar for use with a walk-beside, articulated machine that has a first machine portion and a second machine portion which swivel about a pivot point. A first bar portion, having a first end and a swivel end, is fixably attached to the first machine portion. A swing arm has a first swing arm end and a second swing arm end. The first swing arm end is pivotally attached to the second machine portion. A second bar portion has a first end and a second end. The first end is pivotally attached to the second swing arm end and the second end is pivotally attached to the swivel end of the first bar portion.

In one embodiment, the first and second machine portions include a pair of ground-engaging wheels. The first and second bar portions extend along a side of the first and second machine portions flush with outer edges of the wheels.

BRIEF DESCRIPTION OF THE DRAWINGS

FIG. 2 is a top view of the guidebar of the present invention.

FIG. 3 is a side view of the guidebar of the present invention.

DETAILED DESCRIPTION OF THE PREFERRED EMBODIMENTS

Figure 1:
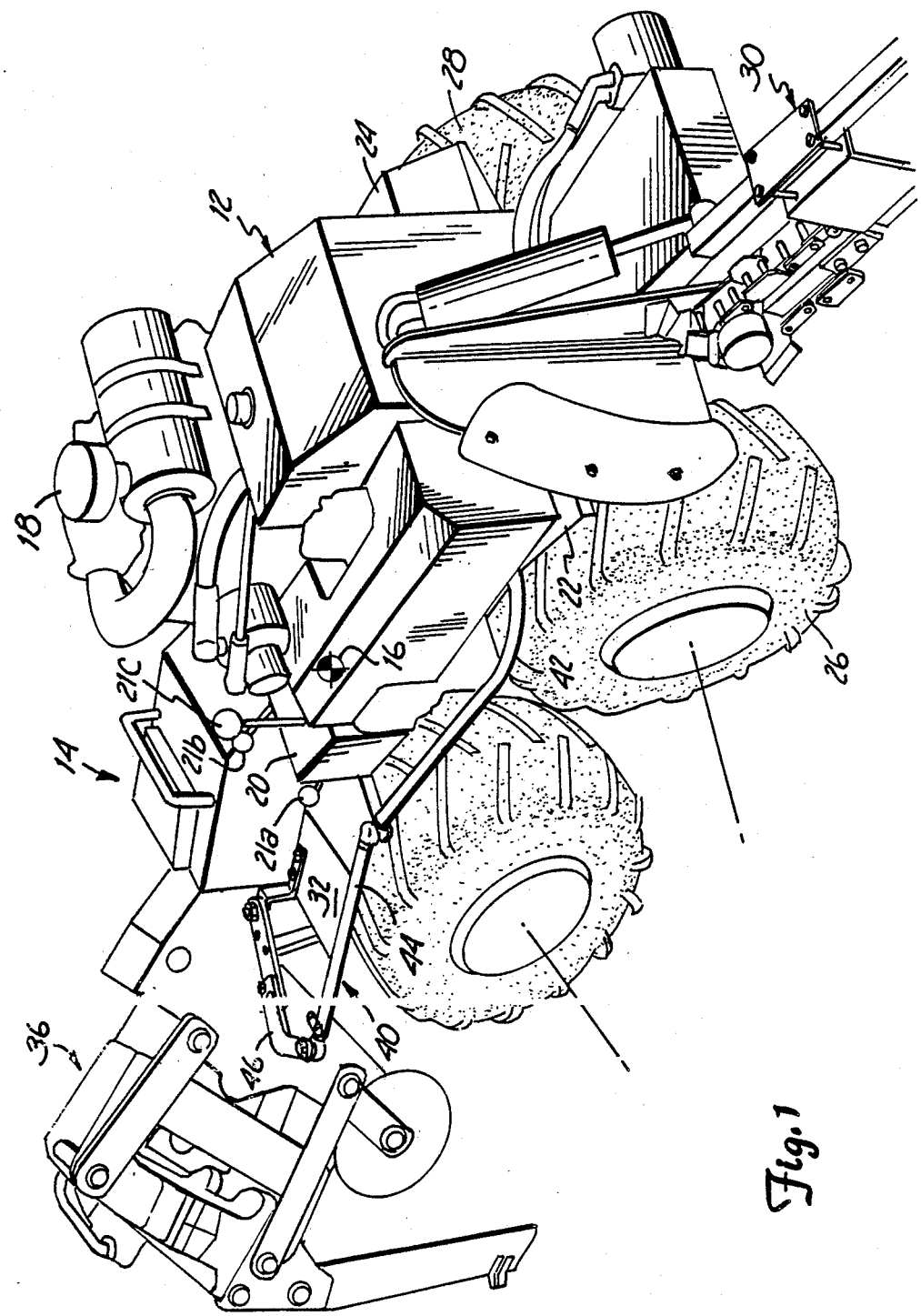
FIG. 1 is an elevational view of a walk-beside, articulated trencher having a guidebar in accordance with the present invention.

FIG. 1 is an illustration of a walk-beside, articulated trencher 10 in accordance with the present invention. Trencher 10 includes front portion or end 12 and rear portion or end 14. For steering purposes, front end 12 and rear end 14 swivel with respect to one another about pivot joint 16. Front end 12 includes engine 18, control panel 20, fenders 22 and 24 and front wheels 26 and 28. Trencher attachment 30 is also mounted on front end 12.

Rear end 14 includes fenders 32 and rear wheels 34. Also, a vibratory plow 36 is mounted on rear end 14 in the embodiment shown.

To operate trencher 10, an operator walks or stands beside trencher 10 next to control panel 20. Control panel 20 includes various levers 21a, 21b and 21c. The operator uses lever 21a to select work or transport range on the hydrostatic traction motor. Lever 21b is used to control the engine speed of trencher 10, and lever 21c is used to control the direction of travel and the travel speed of trencher 10.

A guidebar, shown generally at 40, is mounted to fender 32, fender 22 and control panel 20. Guidebar 40 extends outwardly from the side of trencher 10 so that it is a desired distance from front end 12 and rear end 14. In one embodiment, guidebar 40 extends to a point flush with the outer surface of wheels 26 and 34. Guidebar 40 is arranged so that front end 12 and rear end 14 are allowed to swivel with respect to one another about pivot joint 16 while guidebar 40 remains extended the desired distance from trencher 10. Guidebar 40 extends along substantially the entire side of trencher 10 from front end 12 near trencher attachment 30 to rear end 14 near vibratory plow 36.

Figure 4:
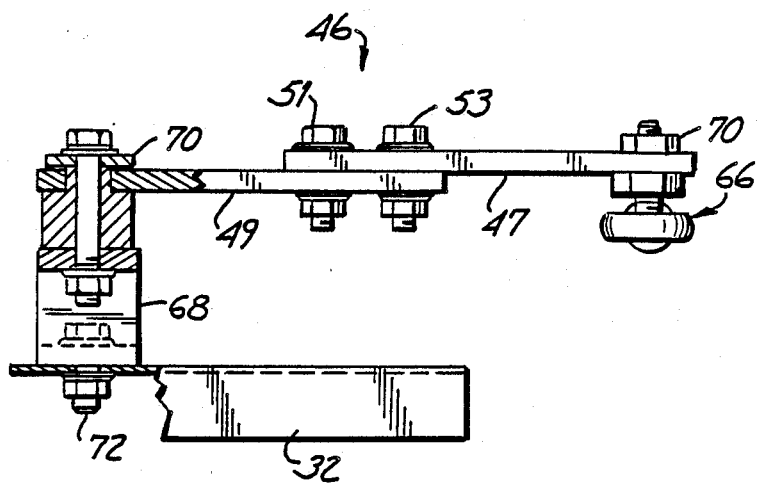
FIG. 4 is a side view of the swing arm of the guidebar.

Guidebar 40 is shown in greater detail in FIGS. 2, 3 and 4. Guidebar 40 comprises three sections or portions: front bar 42, rear bar 44 and swing arm 46. Front bar 42 has a first or forward end 48 which is fixably attached to fender 22 at a forward section of front end 12. In the illustrated embodiment, forward end 48 is bolted to fender 22 using bracket 50 and bolt 51. Also, front bar 42 has a second or swivel end 52 which is fixably attached to control panel 20. Swivel end 52 is bolted to control panel 20 using bracket 54 and bolts 56 and 58.

Rear bar 44 has a first end 60 which is pivotally attached to front bar 42 by a ball swivel joint 62. Also, rear bar 44 has a second end 64 which is pivotally attached to swing arm 46 by a ball swivel joint 66.

Swing arm 46 is comprised of first rail 47 and second rail 49. Rails 47 and 49 are fixably attached to one another with bolts 51 and 53. Swing arm 46 is also pivotally attached to bracket 68 adjacent a rear portion of rear end 14 by ball swivel joint 70. Bracket 68 is fixably attached to rear fender 32 with bolts 72 and 74.

With this arrangement, guidebar 40 allows front end 12 and rear end 14 of trencher 10 to swivel with respect to one another about pivot joint 16. However, due to the fixed arrangement of front bar 42, front bar 42 stays a distance D away from trencher 10. Additionally, the pivotal arrangement of rear bar 44 and swing arm 46 allows rear bar 44 and swing arm 46 to cooperate with front bar 42 so that rear bar 44 remains extended the desired distance D form trencher 10 while front end 12 and rear end 14 swivel about pivot joint 16.

Typically, trencher 10 can be provided with wheels which are wider or narrower than wheels 26, 28 and 34 shown in FIG. 1. Therefore, in order for guidebar 40 to perform its safety enhancement function, it is desirable for distance D to be adjustable. In the illustrated embodiment, a separate set of mounting holes 76, 78, 80, 82 and 84 is provided. Hence, when trencher 10 has narrower wheels, bracket 50 is bolted to fender 22 at mounting hole 76, bracket 54 is bolted to hydrostatic pump 21 at mounting holes 78 and 80, and swing arm 46 is assembled using mounting holes 82 and 84. In that case, guidebar 40 extends a shorter distance D' from trencher 10 which is at least flush with the outer surface of wheels 26 and 34.

Although the present invention has been described with reference to preferred embodiments, workers skilled in the art will recognize that changes may be made in form and detail without departing from the spirit and scope of the invention.

What is claimed is:

1. A guidebar for a walk-beside, articulated machine having a first machine portion and a second machine portion which swivel about a pivot point, the guidebar comprising:
   a first bar portion, having a first end and a swivel end, fixably attached to and extending along a side of the first machine portion;
   a swing arm, having a first swing arm end and a second swing arm end, the first swing arm end being pivotally attached to the second machine portion; and
   a second bar portion extending along a side of the second machine portion and having a first end and a second end, the first end being pivotally attached to the second swing arm end and the second end being pivotally attached to the swivel end of the first bar portion.

2. The guidebar of claim 1 wherein the guidebar extends a buffer distance from the sides of the first and second machine portions.

3. The guidebar of claim 2 and further comprising:
   adjustable mounting means for adjusting the buffer distance that the guidebar extends from the first and second machine portions.

4. The guidebar of claim 2 wherein:
   the first and second machine portions have an outer machine perimeter; and
   the buffer distance is at least flush with the outer machine perimeter.

5. The guidebar of claim 4 wherein:
   the walk-beside, articulated machine has front and rear wheels having an outer surface; and
   the outer machine perimeter is defined by the outer surface of the front and rear wheels.

6. In a walk-beside, articulated trencher of the type having a first machine body section and a second machine body section which swivel about a pivot point, and having a machine perimeter, a guidebar comprising:
   a first bar fixably attached to and extending along a side of the first machine body section;
   a swing arm pivotally attached to the second machine body section; and
   a second bar pivotally attached to the first bar, pivotally attached to the swing arm and extending along a side of the second machine body section.

7. The guidebar of claim 6 wherein the guidebar extends a desired distance from the side of the walk-beside, articulated trencher.

8. The guidebar of claim 7 wherein the desired distance is at least flush with the machine perimeter.

9. The guidebar of claim 8 and further comprising:
   adjustable mounting means for varying the desired distance that the guidebar apparatus extends from the machine perimeter.

10. A walk-beside articulated trencher, including:
    a front body section having a forward end and a pair of ground-engaging wheels;
    a rear body section having a rearward end and a pair of ground-engaging wheels;
    a pivot joint for pivotally coupling the front and rear body sections;
    operator actuated controls on a first side of the front or rear body sections; and
    guidebar means, mounted to the first sides of the front and rear body sections, for extending outwardly from, and along the first sides of the front and rear body sections.

11. The trencher of claim 10 wherein the guidebar means includes:
    a first end mounted adjacent to the forward end of the front body section;
    a second end mounted adjacent to the rearward end of the rear body section; and
    bar means extending between the first and second ends.

12. The trencher of claim 11 wherein the bar means includes:
    a first bar portion, having a first end and a swivel end, fixably attached to and extending along a side of the front body section;
    a swing arm, having a first swing arm end and a second swing arm end, the first swing arm end being pivotally attached to the rear body section; and
    a second bar portion extending along a side of the rear body section and having a first end and a second end, the first end being pivotally attached to the second swing arm end and the second end being pivotally attached to the swivel end of the first bar portion.

13. The trencher of claim 12 wherein the guidebar means extends a buffer distance from the sides of the front and rear body sections.

14. The trencher of claim 13 and further comprising:
    adjustable mounting means for adjusting the buffer distance that the guidebar extends from the front and rear body sections.

15. The trencher of claim 13 wherein:
    the front and rear body sections have an outer machine perimeter; and
    the buffer distance is at least flush with the outer machine perimeter.

16. The trencher of claim 15 wherein:
    the ground-engaging wheels on the front and rear body sections have an outer surface; and
    the outer machine perimeter is defined by the outer surface of the ground-engaging wheels.

* * * * *